United States Patent [19]

Senetar

[11] Patent Number: 5,518,828
[45] Date of Patent: May 21, 1996

[54] THERMAL INTEGRATION OF AN AIR-COOLED FUEL CELL STACK

[75] Inventor: John J. Senetar, Petaluma, Calif.

[73] Assignee: Bechtel Group, Inc., San Francisco, Calif.

[21] Appl. No.: 278,462

[22] Filed: Jul. 21, 1994

[51] Int. Cl.⁶ .............................. H01M 8/04; H01M 8/14
[52] U.S. Cl. .................. 429/26; 429/16; 429/18
[58] Field of Search .................. 429/16, 18, 26

[56] References Cited

U.S. PATENT DOCUMENTS

| | | | |
|---|---|---|---|
| 4,080,487 | 3/1978 | Reiser | 429/26 |
| 4,722,873 | 2/1988 | Matsumura | 429/16 |
| 5,100,743 | 3/1992 | Narita et al. | 429/16 |
| 5,413,878 | 5/1995 | Williams et al. | 429/16 |

Primary Examiner—Prince Willis, Jr.
Assistant Examiner—Carol Chaney
Attorney, Agent, or Firm—Townsend and Townsend and Crew

[57] ABSTRACT

The invention provides a molten carbonate fuel cell system having a plurality of fuel cell stacks, with each fuel cell stack having an anode and a cathode. Each of the anodes includes an anode feed inlet and an anode exhaust outlet, and each cathode includes a cathode feed inlet and a cathode exhaust outlet. A combuster for receiving unreacted fuel from the anode exhaust outlet of a first one of the fuel cell stacks is connected to the cathode feed inlet of a second one of the fuel cell stacks for delivering exhaust from the combuster. An intercooler is disposed between the cathode exhaust outlet of the second fuel cell stack and the cathode feed inlet of the first fuel cell stack for cooling gases passing therebetween.

14 Claims, 4 Drawing Sheets

THERMAL INTEGRATION OF AN AIR-COOLED FUEL CELL STACK

BACKGROUND OF THE INVENTION

The invention is related to fuel cell systems that utilize gas recirculation for fuel cell stack temperature control, and in particular to molten carbonate fuel cell (MCFC) systems.

A fuel cell consists of two distinct reacting chambers commonly referred to as the anode and cathode. Fuel cell systems are constructed of multiple fuel cells operating in parallel and connected electrically in series. The multiple fuel cells are typically combined into one operating unit with the appropriate gas manifolding to form what is commonly referred to as a fuel cell stack.

FIG. 1 illustrates a schematic view of a conventional MCFC system 10. In the MCFC system 10, reformed fuel is delivered to an anode 14 of a fuel cell stack 16 through an anode feed inlet 12 where it reacts with carbonate ions to produce carbon dioxide, water, and electricity. Typically, 70% to 85% of the fuel heating value is consumed in the anode 14. Downstream from the anode 14, the remaining unreacted fuel is delivered to a combustor 18 through an anode exhaust outlet 20. The unreacted fuel is burned in the combustor 18 to produce carbon dioxide and water. Oxygen is supplied to the combustor 18 and may be either air and/or cathode exhaust gases. Various heat integration schemes have been proposed for recuperating both the heat in the cathode exhaust and the heat liberated in the combustor 18 for various purposes such as preheating, steam generation, and supplying the heat required for reforming fuel. The combustor exhaust is mixed with excess air and sent to a cathode 22 of the fuel cell stack 16 through a cathode feed inlet 24 where carbon dioxide and oxygen are reacted to regenerate the carbonate ions consumed at the anode 14.

The overall reaction in the fuel cell stack 16 is that of combustion. Heat is generated in the stack 16 through the heat of reaction of fuel as well as heat generated through ohmic losses. A typical fuel cell system utilizes recirculation of cooled cathode exhaust gases in order to control the fuel cell stack temperature. In some systems, anode gas recirculation is also used. The cathode exhaust gases are recirculated through a cathode exhaust outlet 26 and are directed through a recycle cooler 28. A recycle blower 30 is also used to recirculate the gas. The recycle blower 30 introduces various problems and limitations including decreased reliability, increased maintenance, increased auxiliary power consumption, increased plot space, and increased noise. In addition, recirculation of gases leads to larger gas flows and therefore larger diameter piping between the fuel cell stack 16 and the balance of plant.

SUMMARY OF THE INVENTION

According to the invention, a MCFC system is provided having a plurality of fuel cell stacks. Each fuel cell stack includes an anode and a cathode, with each anode having an anode feed inlet and an anode exhaust outlet, and each cathode having a cathode feed inlet and a cathode exhaust outlet. The system includes a combustor for receiving unreacted fuel from the anode exhaust outlet of a first one of the fuel cell stacks. The combustor is connected to the cathode feed inlet of a second one of the fuel cell stacks for delivering exhaust from the combustor to the second fuel cell stack. An intercooler is provided between the cathode exhaust outlet of the second fuel cell stack and the cathode feed inlet of the second fuel cell stack for cooling gases passing therebetween.

In another embodiment, a MCFC system is provided having a plurality of fuel cell stacks with each fuel cell stack having an anode and a cathode. Each anode includes an anode feed inlet and an anode exhaust outlet, and each cathode includes a cathode feed inlet and a cathode exhaust outlet. A combustor is provided for receiving the reacted fuel from the anode exhaust outlet of a first one of the fuel cell stacks. The combustor is connected to the cathode feed inlet of the first fuel cell stack for delivering exhaust from the combuster. An intercooler between the cathode exhaust outlet of the first fuel cell stack and the cathode feed inlet of a second fuel cell stack is provided for cooling gases passing between the fuel cell stacks.

DETAILED DESCRIPTION OF THE SPECIFIC EMBODIMENTS

Figure 1:
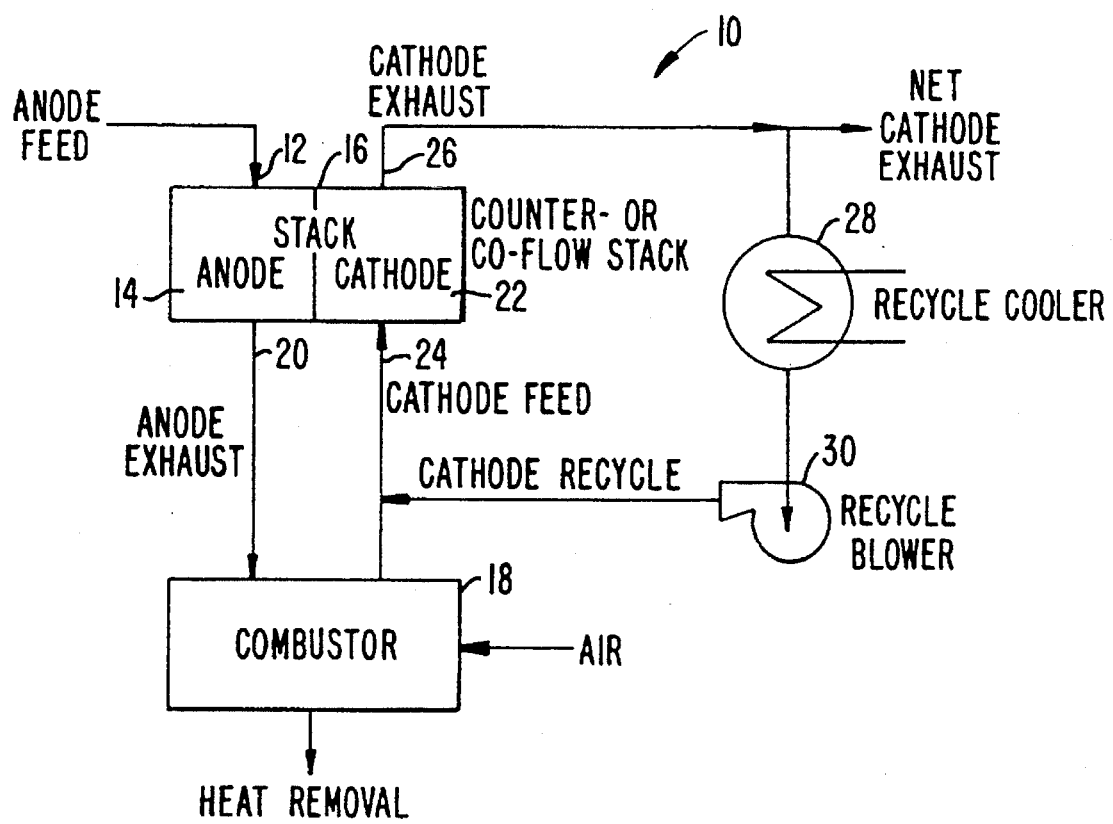
FIG. 1 illustrates a schematic view of a conventional MCFC system.
Figure 2:
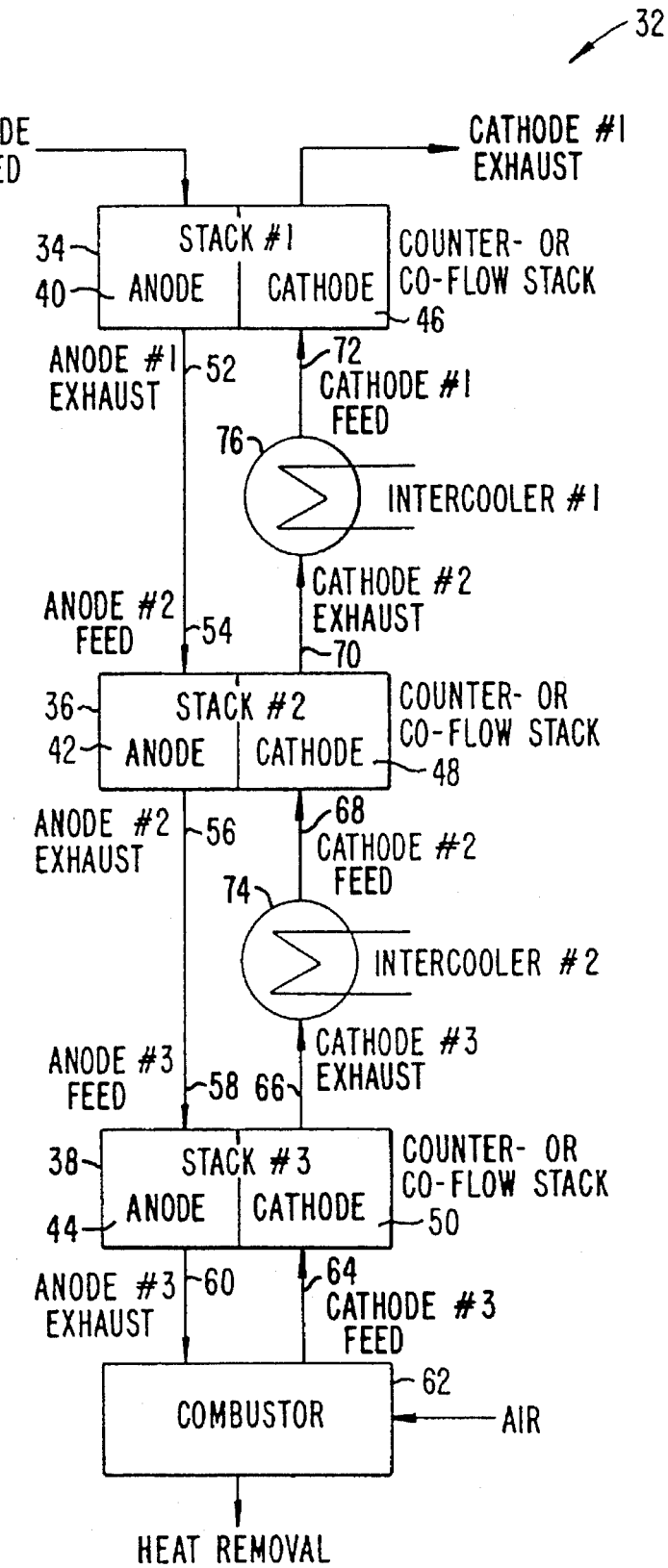
FIG. 2 illustrates one embodiment of a MCFC system according to the present invention.

Shown in FIG. 2 is one embodiment of a MCFC system 32 according to the invention. The system 32 includes three fuel cell stacks 34, 36, and 38. Although three fuel cell stacks are illustrated, the number of stacks in the system can be varied depending upon the cost and operability.

Each of the stacks 34, 36, and 38 have an anode 40, 42, 44, respectively, and a cathode 46, 48, and 50, respectively. Gases from the anode 40 pass through an anode exhaust outlet 52 and enter into anode 42 through an anode feed inlet 54. In a similar manner, gases from anode 42 exit through exhaust outlet 56 and enter anode 44 through anode feed inlet 58. Gases are exhausted from anode 44 through an anode exhaust outlet 60 and into a combuster 62.

Countercurrent to the gasses delivered through the anodes 40, 42, 44, gases are passed through each of the cathodes 50, 48, and 46. Gases from the combuster 62 enter the cathode 50 through a cathode feed inlet 64. Exhaust from cathode 50 exits through a cathode exhaust outlet 66 and enters cathode 48 through a cathode feed inlet 68. In a similar manner, gases from cathode 48 are exited through cathode exhaust outlet 70 and pass into cathode 46 through cathode feed inlet 72. With this arrangement, the anode and cathode gases pass countercurrently between the three stacks 34, 36, and 38 as indicated by the arrows in FIG. 2. Within each of the stacks 34, 36, and 38, the anode and cathode gases may flow either countercurrently or co-currently, depending on the preferred operating conditions for the stacks. Disposed between the stack 38 and the stack 36 is an intercooler 74 for cooling the gases exhausted from cathode exhaust outlet 66. Another intercooler 76 is disposed between the stack 36 and the stack 34 to cool gases exhausted through cathode exhaust outlet 70.

By configuring the stacks 34, 36, and 38 in this manner, the use of a recycle blower can be eliminated. Elimination of the recycle blower leads to a variety of benefits including: increased reliability, decreased maintenance, decreased auxiliary power consumption, decreased plot space, decreased noise, and smaller diameter pipes between fuel cell stacks and the balance of plant. Another benefit of multiple fuel cell stacks is that the total electrical power increases with the number of stacks.

Figure 3:
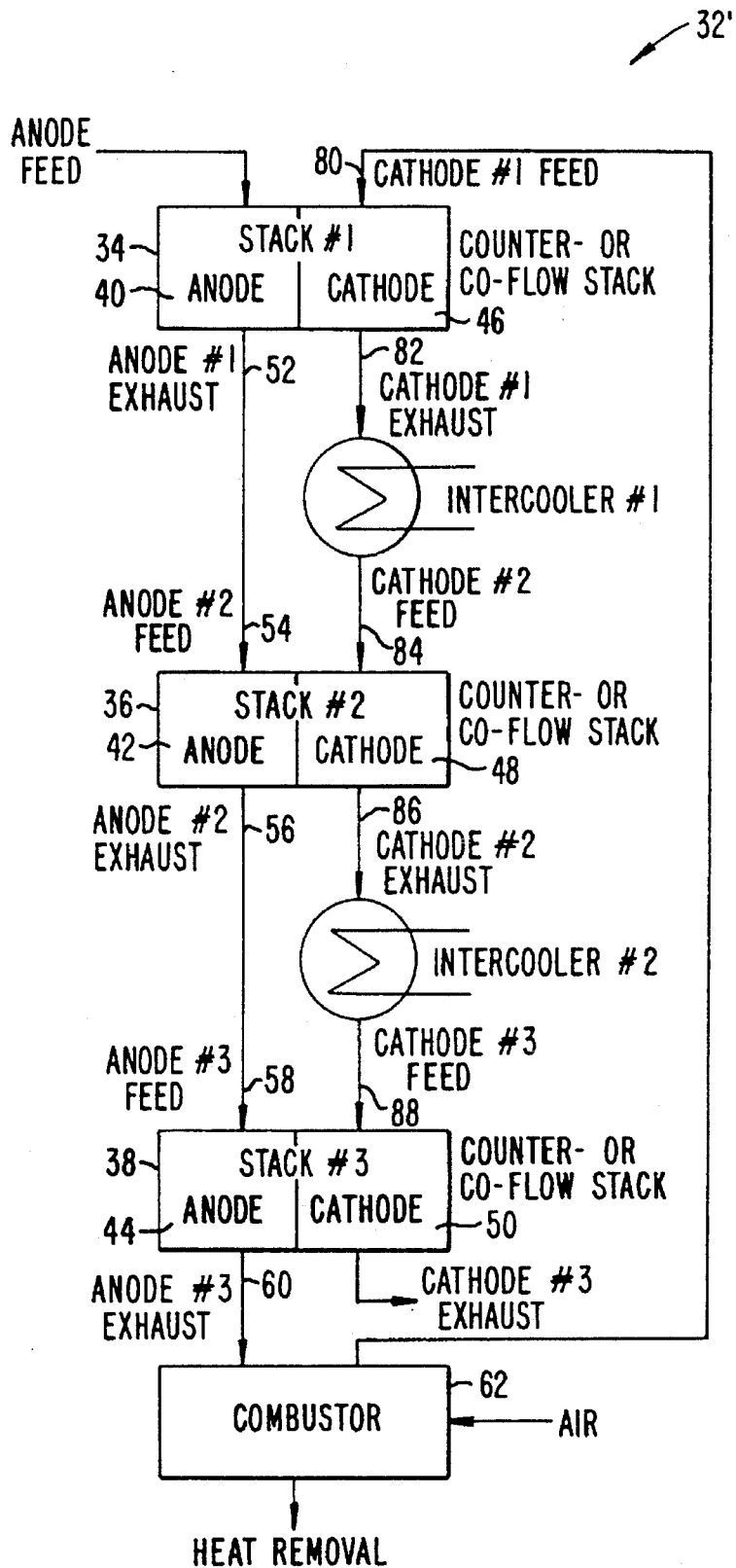
FIG. 3 illustrates an alternative embodiment of a MCFC system according to the present invention.

An alternative embodiment of a MCFC system 32' is shown in FIG. 3. The system 32' is constructed essentially identically to the system 32 of FIG. 2 except for the flow of gases between the cathodes 46, 48, and 50 and the connection of the combuster 62. Gases from the combuster 62 are directed into the cathode 46 through a cathode feed inlet 80, and gases exit from cathode 46 through a cathode exhaust outlet 82 where they enter the cathode 48 through a cathode feed inlet 84. In a similar manner, gases from cathode 48 exit through cathode exhaust outlet 86 and enter the cathode 50 through a cathode feed inlet 88. This configuration allows for the anode and cathode gases to pass co-currently between the stacks 34, 36, and 38. Within the stacks, gases may flow either countercurrently or co-currently.

Calculations were performed to assess the advantages of the invention as described in FIGS. 2 and 3 compared to a conventional system. Table 1 presents a summary of the stack operating conditions for the conventional system, the system 32 (alternative #1), and system 32' (alternative #2). The calculations are based on the following: fixed anode feed, 250 total cells, 80% anode fuel utilization overall, countercurrent flow within each stack, and 70% excess air overall. Within Table 1, stacks #1, #2, and #3 correspond to stacks 34, 36, and 38, respectively.

TABLE 1

COMPARISON OF MULTIPLE CELL STACK ALTERNATIVES

|  |  | Conventional | Alternative #1 | Alternative #1 |  |
| --- | --- | --- | --- | --- | --- |
| Configuration |  |  |  |  |  |
| Total Cells |  | 250 | 250 | 250 |  |
| Number of Stacks |  | 1 | 3 | 3 |  |
| Number of Cathode Intercoolers |  | 0 | 2 | 2 |  |
| Anode Flow Path |  | 1 | 1, 2, 3 | 1, 2, 3 |  |
| Cathode Flow Path |  | 1 | 3, 2, 1 | 1, 2, 3 |  |
| Cell Internal Configuration |  | Counter Flow | Counter Flow | Counter Flow |  |
| Anode Feed Steam-to-Carbon |  | 3.5 | 3.5 | 3.5 |  |
| Stack Operating Conditions |  |  |  |  |  |
| Anode Flow Rates |  |  |  |  |  |
| Anode #1 | lbmol/hr | 37.55 | 37.55 | 37.55 |  |
| Anode #2 | lbmol/hr |  | 43.46 | 43.46 |  |
| Anode #3 | lbmol/hr |  | 49.36 | 49.36 |  |
| Cathode Flow Rates |  |  |  |  |  |
| Cathode #1 | lbmol/hr | 468.83 | 131.42 | 149.13 |  |
| Cathode #2 | lbmol/hr | 140.28 | 140.28 |  |  |
| Cathode #3 | lbmol/hr | 149.13 | 131.42 |  |  |
| Anode Utilization |  |  |  |  |  |
| Anode #1 | fract |  | 0.2667 | 0.2667 |  |
| Anode #2 | fract |  | 0.3637 | 0.3637 |  |
| Anode #3 | fract |  | 0.5716 | 0.5716 |  |
| Overall | fract | 0.8000 | 0.8001 | 0.8001 |  |
| Cathode Utilization |  |  |  |  |  |
| Cathode #1 | fract |  | 0.4983 | 0.2495 |  |
| Cathode #2 | fract |  | 0.3326 | 0.3328 |  |
| Cathode #3 | fract |  | 0.2495 | 0.4983 |  |
| Overall | fract | 0.7487 | 0.7487 | 0.7487 |  |
| Stack Voltage |  |  |  |  |  |
| Stack #1 | volts/cell | 0.706 | 0.781 | 0.811 |  |
| Stack #2 | volts/cell |  | 0.756 | 0.756 |  |
| Stack #3 | volts/cell |  | 0.722 | 0.682 |  |
| Stack Power |  |  |  |  |  |
| Stack #1 | kW d.c. |  | 112.2 | 116.5 |  |
| Stack #2 | kW d.c. |  | 108.3 | 108.3 |  |
| Stack #3 | kW d.c. |  | 103.3 | 97.6 |  |
| Total | kW d.c. | 304.1 | 323.8 | 322.4 |  |
| Stack Temperatures |  |  |  |  |  |
| Anode #1 In | °F. | 1200 | 1200 | 1200 |  |
| Anode #1 out | °F. | 1100 | 1100 | 1100 |  |
| Cathode #1 In | °F. | 1050 | 1050 | 1050 |  |
| Cathode #1 out | °F. | 1290 | Not Calc. | 1266 | Low: Need to Optimize conversion per cell |
| Anode #2 in | °F. |  | 1100 | 1100 |  |
| Anode #2 out | °F. |  | 1100 | 1100 |  |
| Cathode #2 in | °F. |  | 1050 | 1050 |  |
| Cathode #2 out | °F. |  | Not Calc. | 1282 | Close to |

TABLE 1-continued

COMPARISON OF MULTIPLE CELL STACK ALTERNATIVES

|  |  | Conventional | Alternative #1 | Alternative #1 |
|---|---|---|---|---|
|  |  |  |  | 1290° F. |
| Anode #3 in | °F. |  | 1100 | 1100 |
| Anode #3 out | °F. |  | 1100 | 1100 |
| Cathode #3 in | °F. |  | 1050 | 1050 |
| Cathode #3 out | °F. |  | Not Calc. | 1345 | High: Need to Optimize conversion per cell |
| Stack #1 Anode Compositions |  |  |  |  |
| H2 | mole fract. | 0.5058 | 0.5058 | 0.5058 |
| CO | mole fract. | 0.0836 | 0.0836 | 0.0836 |
| CO2 | mole fract. | 0.0669 | 0.0669 | 0.0669 |
| H2O | mole fract. | 0.3362 | 0.3362 | 0.3362 |
| N2 | mole fract. | 0.0006 | 0.0006 | 0.0006 |
| CH4 | mole fract. | 0.0070 | 0.0070 | 0.0070 |
| Total | mole fract. | 1.0001 | 1.0001 | 1.0001 |
| Stack #2 Anode Compositions |  |  |  |  |
| H2 | mole fract. |  | 0.3144 | 0.3144 |
| CO | mole fract. |  | 0.0591 | 0.0591 |
| CO2 | mole fract. |  | 0.2067 | 0.2067 |
| H2O | mole fract. |  | 0.4132 | 0.4132 |
| N2 | mole fract. |  | 0.0005 | 0.0005 |
| CH4 | mole fract. |  | 0.0060 | 0.0060 |
| Total | mole fract. |  | 0.9999 | 0.9999 |
| Stack #3 Anode Compositions |  |  |  |  |
| H2 | mole fract. |  | 0.1677 | 0.1677 |
| CO | mole fract. |  | 0.0416 | 0.0416 |
| CO2 | mole fract. |  | 0.3121 | 0.3121 |
| H2O | mole fract. |  | 0.4729 | 0.4729 |
| N2 | mole fract. |  | 0.0004 | 0.0004 |
| CH4 | mole fract. |  | 0.0053 | 0.0053 |
| Total | mole fract. |  | 1.0000 | 1.0000 |
| Stack #1 Cathode Compositions |  |  |  |  |
| CO2 | mole fract. | 0.0901 | 0.0901 | 0.1586 |
| H2O | mole fract. | 0.2598 | 0.2598 | 0.2290 |
| N2/Ar | mole fract. | 0.5659 | 0.5659 | 0.4986 |
| O2 | mole fract. | 0.0842 | 0.0842 | 0.1138 |
| Total | mole fract. | 1.0000 | 1.0000 | 1.0000 |
| Stack #2 Cathode Compositions |  |  |  |  |
| CO2 | mole fract. |  | 0.1265 | 0.1265 |
| H2O | mole fract. |  | 0.2434 | 0.2434 |
| N2/Ar | mole fract. |  | 0.5302 | 0.5302 |
| O2 | mole fract. |  | 0.0999 | 0.0999 |
| Total | mole fract. |  | 1.0000 | 1.0000 |
| Stack #3 Cathode Compositions |  |  |  |  |
| CO2 | mole fract. |  | 0.1586 | 0.0901 |
| H2O | mole fract. |  | 0.2290 | 0.2598 |
| N2/Ar | mole fract. |  | 0.4986 | 0.5659 |
| O2 | mole fract. |  | 0.1138 | 0.0842 |
| Total | mole fract. |  | 1.0000 | 1.0000 |
| Estimated Pressure Drops |  |  |  |  |
| Cell Pressure Drops Proportional to (Flow Rate/Cell (1.5) |  |  |  |  |
| Anode #1 | Δpsi | 0.10 | 0.52 | 0.52 |
| Anode #1 to Anode #2 | Δpsi |  | 0.05 | 0.05 |
| Anode #2 | Δpsi |  | 0.65 | 0.65 |
| Anode #2 to Anode #3 | Δpsi | 0.05 | 0.05 |  |
| Anode #3 | Δpsi |  | 0.78 | 0.78 |
| Anode #3 to Combustor | Δpsi | 0.05 | 0.05 | 0.05 |
| Combustor | Δpsi | 0.30 | 0.30 | 0.30 |
| Combustor to 1st Cathode | Δpsi | 0.05 | 0.05 | 0.05 |
| 1st Cathode | Δpsi | 0.60 | 0.56 | 0.56 |
| 1st Cathode to 1st Intercooler | Δpsi |  | 0.05 | 0.05 |
| 1st Intercooler | Δpsi |  | 0.10 | 0.10 |
| 1st Intercooler to 2nd Cathode | Δpsi |  | 0.05 | 0.05 |
| 2nd Cathode | Δpsi |  | 0.51 | 0.51 |
| 2nd Cathode to 2nd Intercooler | Δpsi |  | 0.05 | 0.05 |
| 2nd Intercooler | Δpsi |  | 0.10 | 0.10 |

TABLE 1-continued

COMPARISON OF MULTIPLE CELL STACK ALTERNATIVES

|  |  | Conventional | Alternative #1 | Alternative #1 |
|---|---|---|---|---|
| 2nd Intercooler to 3rd Cathode | Δpsi |  | 0.05 | 0.05 |
| 3rd Cathode | Δpsi |  | 0.46 | 0.46 |
| Total | Δpsi | 1.10 | 4.38 | 4.38 |
| Estimated Pressure Profile |  |  |  |  |
| Anode #1 Inlet | psia | 44.00 | 44.00 | 44.00 |
| Anode #1 Outlet | psia | 43.90 | 43.48 | 43.48 |
| Anode #2 Inlet | psia |  | 43.43 | 43.43 |
| Anode #2 Outlet | psia |  | 42.78 | 42.78 |
| Anode #3 Inlet | psia |  | 42.73 | 42.73 |
| Anode #3 Outlet | psia |  | 41.95 | 41.95 |
| Combustor Inlet | psia | 43.85 | 41.90 | 41.90 |
| Combustor Outlet | psia | 43.55 | 41.60 | 41.60 |
| Cathode #1 Inlet | psia | 43.50 | 40.08 | 41.55 |
| Cathode #1 Outlet | psia | 42.90 | 39.62 | 40.99 |
| Intercooler #1 Inlet | psia |  | 40.23 | 40.94 |
| Intercooler #2 Outlet | psia |  | 40.13 | 40.84 |
| Cathode #2 Inlet | psia |  | 40.79 | 40.79 |
| Cathode #2 Outlet | psia |  | 40.28 | 40.28 |
| Intercooler #2 Inlet | psia |  | 40.94 | 40.23 |
| Intercooler #2 Outlet | psia |  | 40.84 | 40.13 |
| Cathode #3 Inlet | psia |  | 41.55 | 40.08 |
| Cathode #3 Outlet | psia |  | 40.99 | 39.62 |
| Estimated Wet Seal Differential Pressures |  |  |  |  |
| Anode #1 In-Cathode #1 Out | Δpsi | 1.10 | 4.38 | 3.01 |
| Anode #1 Out-Cathode #1 In | Δpsi | 0.40 | 3.40 | 1.93 |
| Anode #2 In-Cathode #2 Out | Δpsi |  | 3.15 | 3.15 |
| Anode #2 Out-Cathode #2 In | Δpsi |  | 1.99 | 1.99 |
| Anode #3 In-Cathode #3 Out | Δpsi |  | 1.74 | 3.12 |
| Anode #3 Out-Cathode #3 In | Δpsi |  | 0.40 | 1.87 |

These results indicate that gas recirculation is not necessary for stack temperature control. The pressure drop for a three stack system is greater than that of a single stack system. The differential pressures between the anode and cathode side of the stacks can be minimized by using co-flow inside each stack and by using co-flow between the stacks.

The advantages of using multiple fuel stacks does not necessarily require distinct heat exchangers between the cell stacks. The heat removal may be incorporated within the fuel cell manifolding, between or within fuel cell stacks, and from both the anode and cathode gases. In addition, the invention is not limited to the method of stack cooling. Stack cooling may be through indirect heat transfer to cool gases and/or saturated steam or through heat transfer to an "indirect reformer" within the fuel cell stack.

Figure 4:
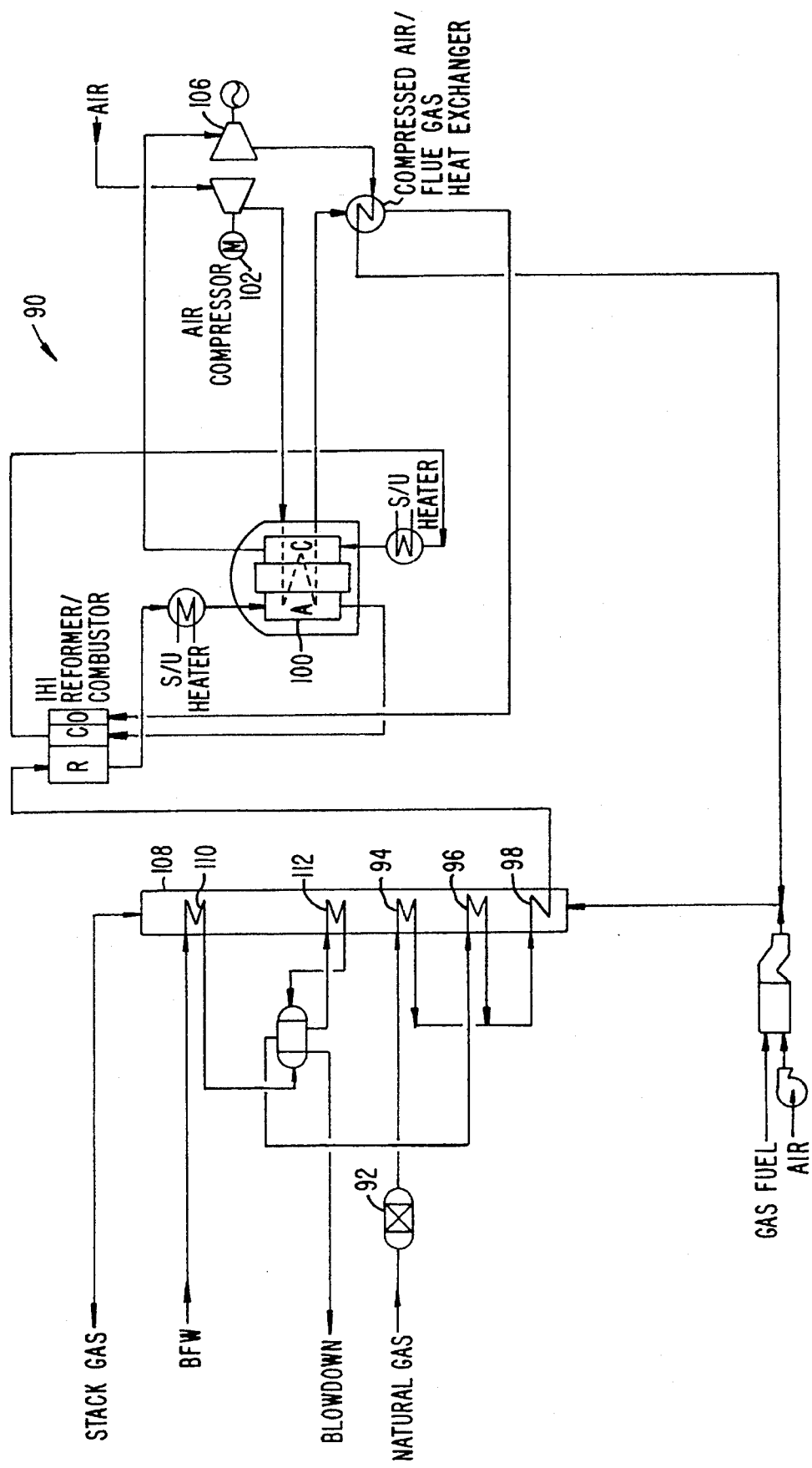
FIG. 4 illustrates a plant configuration using a MCFC system according to the present invention.

FIG. 4 illustrates one embodiment of a plant configuration 90 utilizing a MCFC system according to the invention. In the plant 90, natural gas is desulfurized in a desulfurizer 92, preheated in a gas preheater 94, mixed with superheated steam from a superheater 96, and further preheated by a mixed feed preheater 98, and sent to a reformer R. An exemplary reformer is a reformer developed by IHI, Japan, where the heat required for reforming is supplied by burning residual fuel that is unconverted in the fuel cell. The majority of the fuel is consumed (via oxidation) to produce electricity. Only a portion of the chemical energy of the reformed gas is converted to electrical energy in the fuel cell. The portion of chemical energy that is not converted to electricity is released as thermal energy (heat). This heat must be removed to avoid the fuel cell exceeding its maximum temperature.

Compressed air from an air compressor 102 provides the necessary cooling medium for heat removal from the stack 100. This is an improvement over the existing state of the art MCFC systems which use recycled cathode exhaust (and in some cases, anode exhaust also) to provide cooling for the fuel cell. In the prior art systems, recirculation of gas requires a recycle blower that operates at temperatures close to 1300° F. Such a blower adds additional expense, consumes electricity, i.e., lowers the plant efficiency, and increases plant downtime due to mechanical failures. Furthermore, large diameter piping is required to provide the necessary path for the recycled gas. The use of air cooling eliminates the need for gas circulation, thereby reducing the plant cost and increasing the overall plant electrical efficiency.

The compressed air exiting the fuel cell intercooler picks up additional energy from flue gas exiting an expander/generator 106, and then flows to a combuster CO. The hot compressed air supplies the oxygen necessary for combustion of the anode exhaust. The combuster exhaust gas flows to the fuel cell cathode C where carbon dioxide and oxygen are consumed. The cathode exhaust gas flows to the expander/generator 106, which recovers some of the energy in the cathode exhaust to produce electricity. The expander exhaust gas provides heat to the compressed air and flows to a heat recovery steam generator (HRSG) 108. The HRSG 108 recovers heat from the processed flue gas for the following purposes: (1) preheating incoming boiler feed water in an economizer 110; (2) generating saturated steam in a boiler 112; (3) heating saturated steam in the superheater 96; (4) preheating desulfurized natural gas in the gas preheater 94; and (5) preheating mixed natural gas and superheated steam in the mixed feed preheater 98.

Alternative heat integration schemes may employ some or all of the following process options: (1) The use of a turbocharger/generator system in place of a separate air compressor and expander/generator. (2) The placement of the startup burner on the compressed air line between the compressor discharge and the cell intercooler inlet. (This option can eliminate the need for electric startup heaters at the inlet of the fuel cell anode and cathode.) (3) The relocation of the compressed air/flue gas heat exchanger from downstream of the cell intercooler to upstream of the intercooler. This option increases the amount of heat recoverable from the expanding exhaust and increases the temperature of compressed air entering the intercooler (desirable for protecting the fuel cell electrolyte from freezing). This heat exchanger is preferably integrated into the HRSG.

The present invention has been described in detail for purposed of clarity and understanding. It is understood that this invention is not confined to the specific instruction described herein, but it encompasses modified forms within the scope of the following claims.

What is claimed is:

1. A molten carbonate fuel cell system, comprising:
   a fuel cell having an anode and a cathode, with the anode having an anode feed inlet and an anode exhaust outlet, and with the cathode having a cathode feed inlet and a cathode exhaust outlet, the fuel cell further including heat removal means, wherein the heat removal means comprises an intercooler for channeling the compressed air through the fuel cell;
   means for supplying fuel to the anode feed inlet; and
   means for supplying compressed air to the heat removal means.

2. The system of claim 1, further comprising means for heating the compressed air prior to entering the heat removal means.

3. The system of claim 2, wherein the heating means includes a heat exchanger for transferring heat to the compressed air from gases circulated from the cathode exhaust outlet.

4. The system of claim 2, further comprising a combuster between the anode exhaust outlet and the cathode feed inlet, and wherein the compressed air is circulated from the fuel cell and to the combuster.

5. The system of claim 4, wherein gases exhausted from the anode exhaust outlet are circulated to the combuster.

6. A process for operating a fuel cell power plant including a combuster and a fuel cell having an anode and a cathode, with the anode having an anode feed inlet and an anode exhaust outlet, and with the cathode having a cathode feed inlet and a cathode exhaust outlet, said process comprising:
   supplying fuel to the anode through the anode feed inlet;
   circulating exhaust from the anode exhaust outlet, through the combuster, and to the cathode feed inlet; and
   supplying compressed air to an intercooler which channels the compressed air through the fuel cell to remove sufficient heat from the fuel cell to prevent overheating of the fuel cell.

7. The process of claim 6, further comprising heating the compressed air prior to supplying the compressed air to the fuel cell.

8. The process of claim 7, wherein the compressed air is heated by gases exhausted from the cathode exhaust outlet.

9. A molten carbonate fuel cell system, comprising:
   a fuel cell having an anode and a cathode, with the anode having an anode feed inlet and an anode exhaust outlet, and with the cathode having a cathode feed inlet and a cathode exhaust outlet, the fuel cell further including heat removal means;
   means for supplying fuel to the anode feed inlet;
   means for supplying compressed air to the heat removal means; and
   means for heating the compressed air prior to entering the heat removal means, wherein the heating means includes a heat exchanger for transferring heat to the compressed air from gases circulated from the cathode exhaust outlet.

10. The system of claim 9, further comprising a combuster between the anode exhaust outlet and the cathode feed inlet, and wherein the compressed air is circulated from the fuel cell and to the combuster.

11. The system of claim 10, wherein gases exhausted from the anode exhaust outlet are circulated to the combuster.

12. The system of claim 9, further comprising an intercooler which channels the compressed air through the fuel cell.

13. A process for operating a fuel cell power plant including a combuster and a fuel cell having an anode and a cathode, with the anode having an anode feed inlet and an anode exhaust outlet, and with the cathode having a cathode feed inlet and a cathode exhaust outlet, said process comprising:
   supplying fuel to the anode through the anode feed inlet;
   circulating exhaust from the anode exhaust outlet, through the combuster, and to the cathode feed inlet;
   supplying compressed air to the fuel cell to remove sufficient heat from the fuel cell to prevent overheating of the fuel cell, wherein the compressed air is heated prior to supplying the compressed air to the fuel cell, and wherein the compressed air is heated by a heat exchanger receiving gases exhausted from the cathode exhaust outlet.

14. The process of claim 3, wherein the supplying step further comprises channeling the compressed air through the fuel cell with an intercooler.

* * * * *